United States Patent
Chikuma

(10) Patent No.: US 11,538,634 B2
(45) Date of Patent: Dec. 27, 2022

(54) MULTILAYER CERAMIC ELECTRONIC COMPONENT INCLUDING AN INSULATING LAYER

(71) Applicant: Murata Manufacturing Co., Ltd., Nagaokakyo (JP)

(72) Inventor: Shinobu Chikuma, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 17/169,704

(22) Filed: Feb. 8, 2021

(65) Prior Publication Data

US 2021/0272753 A1    Sep. 2, 2021

(30) Foreign Application Priority Data

Feb. 27, 2020   (JP) ............................ JP2020-031209

(51) Int. Cl.
| | |
|---|---|
| H01G 4/224 | (2006.01) |
| H01G 4/232 | (2006.01) |
| H01G 4/30 | (2006.01) |
| H01G 4/12 | (2006.01) |

(52) U.S. Cl.
CPC ........... *H01G 4/224* (2013.01); *H01G 4/1209* (2013.01); *H01G 4/1245* (2013.01); *H01G 4/30* (2013.01); *H01G 4/2325* (2013.01)

(58) Field of Classification Search
CPC ...... H01G 4/30; H01G 4/2325; H01G 4/1209; H01G 4/224
See application file for complete search history.

(56) References Cited

U.S. PATENT DOCUMENTS

| | | | | |
|---|---|---|---|---|
| 2006/0180899 A1* | 8/2006 | Ko | .......................... | H01G 4/232 257/E23.118 |
| 2009/0108984 A1* | 4/2009 | Choi | ................ | H01C 17/06533 29/612 |
| 2009/0310277 A1* | 12/2009 | Kayatani | ................ | H01G 4/005 29/25.42 |
| 2010/0271751 A1* | 10/2010 | Sasabayashi | .......... | H01G 4/232 361/301.4 |

(Continued)

FOREIGN PATENT DOCUMENTS

| | | |
|---|---|---|
| JP | 09-180957 A | 7/1997 |
| JP | 2000306765 A * | 11/2000 |

(Continued)

OTHER PUBLICATIONS

First Office Action in JP2020031209, dated Sep. 6, 2022, 4 pages.

*Primary Examiner* — David M Sinclair
(74) *Attorney, Agent, or Firm* — Keating & Bennett, LLP

(57) ABSTRACT

A multilayer ceramic electronic component includes a multilayer body including layered ceramic layers and having a rectangular parallelepiped shape, and first and second outer electrodes covering both end surfaces of the multilayer body and extending from both the end surfaces so as to cover at least portions of a first main surface, a second main surface, a first side surface, and a second side surface of the multilayer body. An insulating layer is provided on a surface of the first main surface of the multilayer body. The first outer electrode and the second outer electrode disposed on the first main surface side are disposed on the insulating layer.

16 Claims, 4 Drawing Sheets

(56) References Cited

U.S. PATENT DOCUMENTS

| | | | |
|---|---|---|---|
| 2013/0057112 A1* | 3/2013 | Shirakawa | H01G 4/232 336/200 |
| 2014/0083755 A1* | 3/2014 | Lee | H01G 2/24 338/21 |
| 2014/0085852 A1* | 3/2014 | Park | H01G 4/224 361/782 |
| 2014/0340816 A1* | 11/2014 | Takaoka | H01G 4/008 361/305 |
| 2018/0144864 A1* | 5/2018 | Park | H01G 4/012 |
| 2018/0182558 A1* | 6/2018 | Byun | H01G 4/012 |
| 2018/0286591 A1* | 10/2018 | Kim | H01G 4/12 |
| 2018/0286594 A1 | 10/2018 | Kim et al. | |
| 2020/0090871 A1* | 3/2020 | Ahn | H01G 4/232 |

FOREIGN PATENT DOCUMENTS

| | | | | |
|---|---|---|---|---|
| JP | 2001-044069 A | | 2/2001 | |
| JP | 2012182379 A | | 9/2012 | |
| JP | 2012-222124 A | | 11/2012 | |
| JP | 2014027085 A | * | 2/2014 | H01G 4/232 |
| JP | 2014187317 A | * | 10/2014 | H01G 4/232 |
| JP | 2018182274 A | | 11/2018 | |
| KR | 20150047384 A | * | 5/2015 | |

* cited by examiner

IV-IV CROSS SECTIONAL VIEW

VII-VII CROSS SECTIONAL VIEW

MULTILAYER CERAMIC ELECTRONIC COMPONENT INCLUDING AN INSULATING LAYER

CROSS REFERENCE TO RELATED APPLICATIONS

This application claims the benefit of priority to Japanese Patent Application No. 2020-031209 filed on Feb. 27, 2020. The entire contents of this application are hereby incorporated herein by reference.

BACKGROUND OF THE INVENTION

1. Field of the Invention

The present invention relates to a multilayer ceramic electronic component, and particularly, a multilayer ceramic capacitor or the like.

2. Description of the Related Art

A conventional multilayer ceramic capacitor includes outer layer portions on both main surface sides of a multilayer body. Each of the outer layer portions is composed of a ceramic. Outer electrodes are disposed on both end surfaces of the multilayer body so as to cover the outer layer portions. In the case where such a multilayer ceramic capacitor is mounted on a mounting substrate using a solder, a crack may be generated from an end portion of a joined portion between an outer electrode and the solder when the substrate is deflected.

Japanese Patent Laid-Open No. 9-180957 discloses a multilayer ceramic capacitor to address such a crack resulting from deflection. In this multilayer ceramic capacitor, inner electrodes are embedded in layers made of a dielectric ceramic. At both ends of the multilayer ceramic capacitor, terminal electrodes (outer electrodes) each including an underlying electrode, a Ni-containing plating layer, and a Sn-containing plating layer are formed. In this multilayer ceramic capacitor, a portion of an end portion of each terminal electrode in contact with the dielectric ceramic is covered with an electrically insulating layer having low wettability with respect to a solder.

However, when such an electrically insulating layer is formed on a bottom surface portion in the multilayer ceramic capacitor after each terminal electrode is formed, a distance will be provided between a conductor surface of the terminal electrode and a solder disposed on an upper surface of a land electrode provided on a surface of a mounting substrate, with the result that a problem such as a tombstone phenomenon is likely to occur during mounting by reflow of a solder, disadvantageously.

SUMMARY OF THE INVENTION

Preferred embodiments of the present invention provide multilayer ceramic electronic components that each have an improved mechanical strength and that are each able to be stably mounted on a mounting substrate.

A multilayer ceramic electronic component according to a preferred embodiment of the present invention includes a multilayer body including a plurality of layered ceramic layers and a plurality of inner electrode layers layered on the ceramic layers, a first main surface and a second main surface facing each other in a layering direction, a first end surface and a second end surface facing each other in a length direction orthogonal or substantially orthogonal to the layering direction, and a first side surface and a second side surface facing each other in a width direction orthogonal or substantially orthogonal to the layering direction and the length direction; a first outer electrode covering the first end surface and extending from the first end surface so as to cover portions of the first main surface, the second main surface, the first side surface, and the second side surface; and a second outer electrode covering the second end surface and extending from the second end surface so as to cover portions of the first main surface, the second main surface, the first side surface, and the second side surface, wherein an insulating layer is provided on a surface of the first main surface of the multilayer body, and the first outer electrode and the second outer electrode disposed on the first main surface side are disposed on the insulating layer.

In a multilayer ceramic electronic component according to a preferred embodiment of the present invention, the insulating layer is provided on an entirety or substantially an entirety of the first main surface of the multilayer body, the insulating layer is disposed on and an entirety or substantially an entirety of the first main surface of the multilayer body, the first outer electrode disposed on the first main surface side is disposed on the insulating layer, and the second outer electrode disposed on the first main surface side is disposed on the insulating layer. Thus, the end edge portions of the first and second outer electrodes on the first main surface side are disposed on the insulating layer. The end edge portions of the first and second outer electrodes on the first main surface side are portions at which stress is concentrated in the multilayer ceramic electronic component when the multilayer ceramic electronic component is mounted on a mounting substrate. Thus, mechanical strength against stress on the multilayer ceramic electronic component is improved.

According to preferred embodiments of the present invention, multilayer ceramic electronic components that each have an improved mechanical strength and that are each able to be stably mounted on a mounting substrate are provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

1. Multilayer Ceramic Electronic Component

A multilayer ceramic capacitor as an exemplary multilayer ceramic electronic component according to a preferred embodiment of the present invention will be described.

Figure 1:
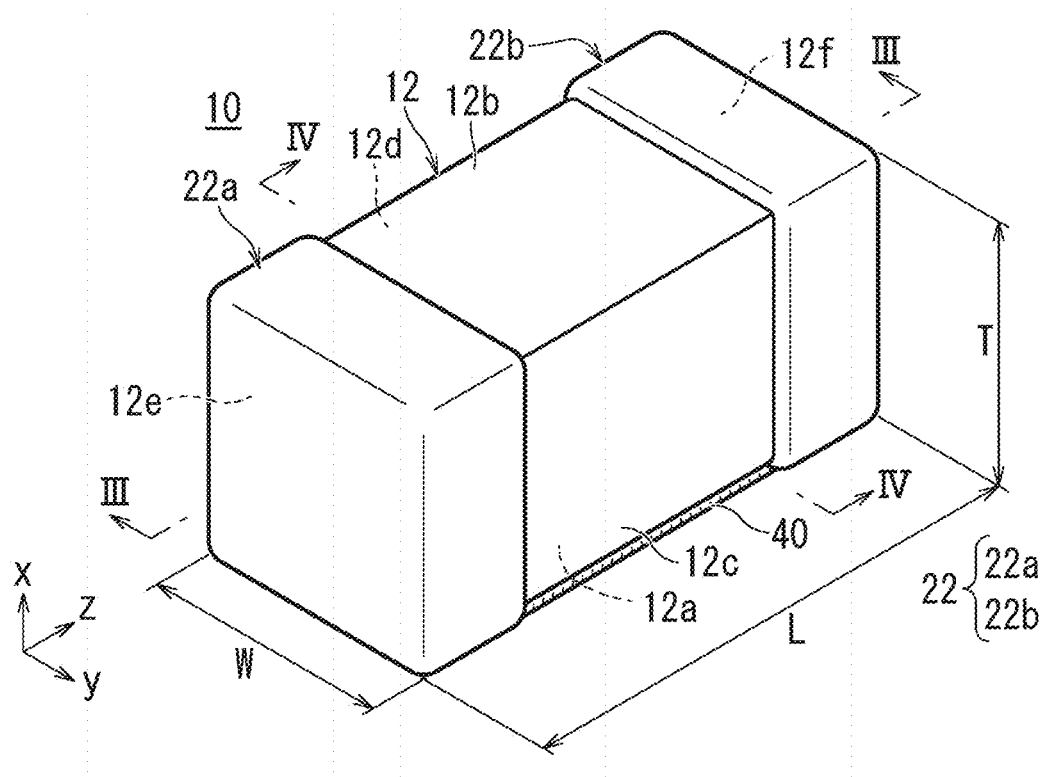
FIG. 1 is an external perspective view showing a multilayer ceramic capacitor as an exemplary multilayer ceramic electronic component according to a preferred embodiment of the present invention.
Figure 2:
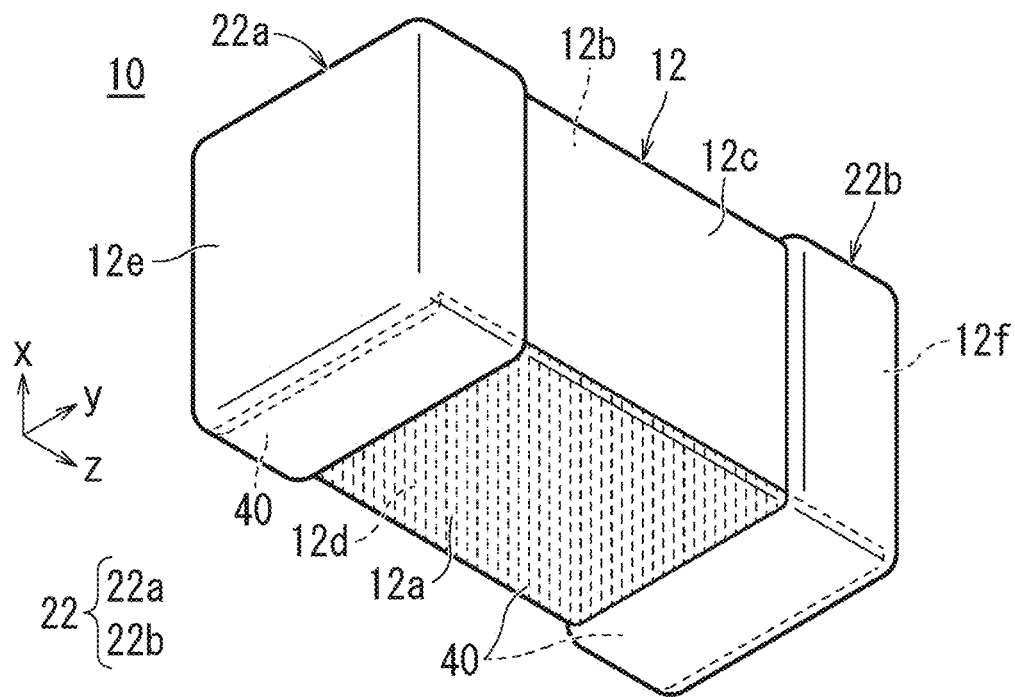
FIG. 2 is another external perspective view showing a multilayer ceramic capacitor as an exemplary multilayer ceramic electronic component according to a preferred embodiment of the present invention.
Figure 3:
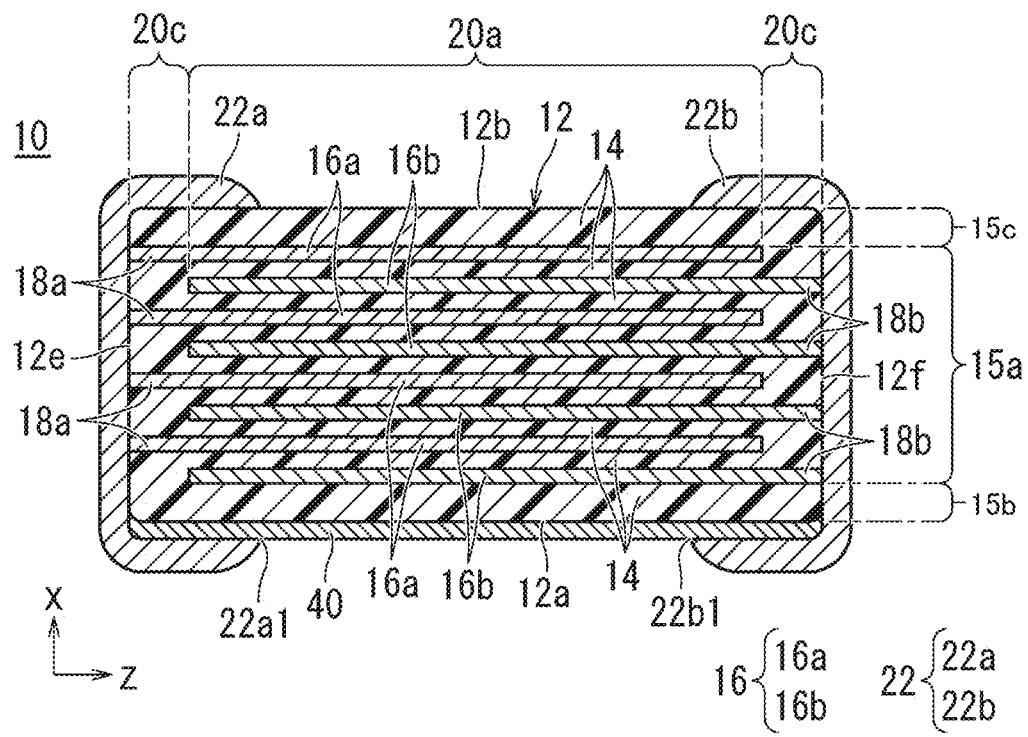
FIG. 3 is a cross sectional view taken along a line III-III in FIG. 1.
Figure 4:
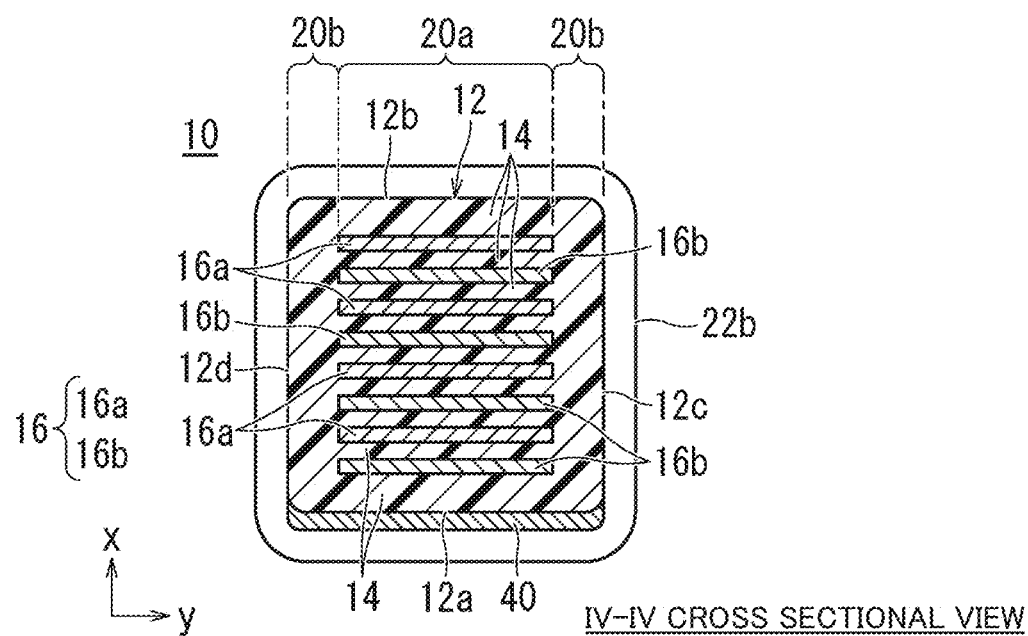
FIG. 4 is a cross sectional view taken along a line IV-IV in FIG. 1.

FIG. 1 is an external perspective view showing a multilayer ceramic capacitor as an exemplary multilayer ceramic electronic component according to a preferred embodiment of the present invention. FIG. 2 is another external perspective view showing the multilayer ceramic capacitor as the exemplary multilayer ceramic electronic component according to the present preferred embodiment of the present invention. FIG. 3 is a cross sectional view taken along a line III-III in FIG. 1. FIG. 4 is a cross sectional view taken along a line IV-IV in FIG. 1.

A multilayer ceramic capacitor 10 includes a multilayer body 12 having a rectangular or substantially rectangular parallelepiped shape as shown in FIGS. 1 to 4, for example. Multilayer body 12 includes a plurality of layered ceramic layers 14 and a plurality of layered inner electrode layers 16. Further, multilayer body 12 includes a first main surface 12a and a second main surface 12b facing each other in a layering direction x, a first side surface 12c and a second side surface 12d facing each other in a width direction y orthogonal or substantially orthogonal to layering direction x, and a first end surface 12e and a second end surface 12f facing each other in a length direction z orthogonal or substantially orthogonal to layering direction x and width direction y. Multilayer body 12 preferably has rounded corners and rounded ridgeline portions. It should be noted that the term "corner portion" refers to a portion at which adjacent three surfaces of the multilayer body intersect, and the term "ridgeline portion" refers to a portion at which adjacent two surfaces of the multilayer body intersect.

For a dielectric material of each ceramic layer 14 of multilayer body 12, a dielectric ceramic including a component such as $BaTiO_3$, $CaTiO_3$, $SrTiO_3$, Pb, Fe ferrite beads, or $CaZrO_3$ may preferably be used, for example. Further, a compound such as a Mn compound, a Fe compound, a Cr compound, a Co compound or a Ni compound, for example, may be added to the component such that the content of the compound falls within a range of contents smaller than the content of the main component. A dimension of ceramic layer 14 in layering direction x is preferably more than or equal to about 0.3 μm and less than or equal to about 5.0 μm, for example.

It should be noted that when a piezoelectric ceramic is used for multilayer body 12, the multilayer ceramic electronic component defines and functions as a ceramic piezoelectric element. Specific examples of the piezoelectric ceramic material include a PZT (lead zirconate titanate)-based ceramic material and the like.

When a semiconductor ceramic is used for multilayer body 12, the multilayer ceramic electronic component defines and functions as a thermistor element. Specific examples of the semiconductor ceramic material include a spinel-based ceramic material and the like.

When a magnetic ceramic is used for multilayer body 12, the multilayer ceramic electronic component functions as an inductor element. When the multilayer ceramic electronic component defines and functions as an inductor element, inner electrode layer 16 is a conductor having a coil shape. Specific examples of the magnetic ceramic material include a ferrite ceramic material and the like.

In layering direction x that connects first main surface 12a to second main surface 12b, multilayer body 12 includes an effective layer portion 15a in which inner electrode layers 16 face one another, a first outer layer portion 15b located between first main surface 12a and an inner electrode layer 16 closest to first main surface 12a, and a second outer layer portion 15c located between second main surface 12b and an inner electrode layer 16 closest to second main surface 12b.

First outer layer portion 15b includes a plurality of ceramic layers 14 located on the first main surface 12a side of multilayer body 12 and located between first main surface 12a and inner electrode layer 16 closest to first main surface 12a.

Second outer layer portion 15c includes a plurality of ceramic layers 14 located on the second main surface 12b side of multilayer body 12 and located between second main surface 12b and inner electrode layer 16 closest to second main surface 12b.

Effective layer portion 15a is a region between first outer layer portion 15b and second outer layer portion 15c.

It should be noted that the thickness of effective layer portion 15a is preferably more than or equal to about 10 μm and less than or equal to about 3000 μm, for example.

It should be noted that a dimension of multilayer body 12 in layering direction x is preferably more than or equal to about 100 μm and less than or equal to about 4 mm, a dimension of multilayer body 12 in length direction z is preferably more than or equal to about 100 μm and less than or equal to about 3 mm, and a dimension of multilayer body 12 in width direction y is preferably more than or equal to about 100 μm and less than or equal to about 3 mm, for example. The number of layered ceramic layers 14 including both outer layer portions 15b, 15c is preferably more than or equal to 100 and less than or equal to 1400, for example.

As shown in FIGS. 3 and 4, for example, multilayer body 12 includes a plurality of first inner electrode layers 16a and a plurality of second inner electrode layers 16b as the plurality of inner electrode layers 16. Each of first inner electrode layers 16a and second inner electrode layers 16b has a rectangular or substantially rectangular shape, for example. The plurality of first inner electrode layers 16a and the plurality of second inner electrode layers 16b are embedded and alternately disposed at equal or substantially equal intervals along layering direction x of multilayer body 12.

On one end side of each first inner electrode layer 16a, a first drawn electrode portion 18a is provided to be drawn to first end surface 12e of multilayer body 12. On one end side of each second inner electrode layer 16b, a second drawn electrode portion 18b is provided to be drawn to second end surface 12f of multilayer body 12. Specifically, first drawn electrode portion 18a on the one end side of first inner electrode layer 16a is exposed at first end surface 12e of multilayer body 12. Second drawn electrode portion 18b on the one end side of second inner electrode layer 16b is exposed at second end surface 12f of multilayer body 12.

As shown in FIGS. 3 and 4, for example, in effective layer portion 15a of ceramic layers 14, multilayer body 12 includes a facing electrode portion 20a in which first inner electrode layers 16a and second inner electrode layers 16b face one another. Multilayer body 12 includes side portions (hereinafter, referred to as "W gaps") 20b provided between first side surface 12c and one end of facing electrode portion 20a in width direction y and between second side surface 12d and the other end of facing electrode portion 20a in width direction y. Further, multilayer body 12 includes end portions (hereinafter, referred to as "L gaps") 20c provided between second end surface 12f and an end portion of first inner electrode layer 16a opposite to first drawn electrode portion 18a and between first end surface 12e and an end portion of second inner electrode layer 16b opposite to second drawn electrode portion 18b. Here, the length of each L gap 20c defining and functioning as the end portion of multilayer body 12 is preferably more than or equal to about 10 μm and less than or equal to about 300 μm, for example. The length of each W gap 20b defining and functioning as the side portion of multilayer body 12 is preferably more than or equal to about 5 μm and less than or equal to about 300 μm, for example.

In multilayer body 12, for example, as shown in FIGS. 3 and 4, first inner electrode layers 16a and second inner electrode layers 16b face one another with ceramic layers 14 being interposed therebetween in facing electrode portion 20a, thus providing a capacitance. Therefore, a capacitance can be obtained between a first outer electrode 22a to which first inner electrode layers 16a are connected and a second outer electrode 22b to which second inner electrode layers 16b are connected. Therefore, the multilayer ceramic electronic component having such a structure defines and functions as a capacitor.

Each inner electrode layer 16 preferably includes, for example, a metal such as Ni, Cu, or Ag. Inner electrode layer 16 may further include dielectric particles having the same or similar composition as the ceramic included in ceramic layer 14. The thickness of inner electrode layer 16 is preferably more than or equal to about 0.1 μm and less than or equal to about 3.0 μm, for example.

Outer electrodes 22 are provided on the first end surface 12e side and the second end surface 12f side of multilayer body 12. Outer electrodes 22 include first outer electrode 22a and second outer electrode 22b.

First outer electrode 22a is provided on the first end surface 12e side of multilayer body 12. First outer electrode 22a covers first end surface 12e of multilayer body 12 and extends from first end surface 12e so as to cover respective portions of first main surface 12a, second main surface 12b, first side surface 12c, and second side surface 12d. In this case, first outer electrode 22a is electrically connected to first drawn electrode portions 18a of first inner electrode layers 16a. It should be noted that first outer electrode 22a is disposed on first main surface 12a with an insulating layer 40 interposed therebetween.

Second outer electrode 22b is provided on the second end surface 12f side of multilayer body 12. Second outer electrode 22b covers second end surface 12f of multilayer body 12 and extends from second end surface 12f so as to cover respective portions of first main surface 12a, second main surface 12b, first side surface 12c, and second side surface 12d. In this case, second outer electrode 22b is electrically connected to second drawn electrode portions 18b of second inner electrode layers 16b. It should be noted that first outer electrode 22a is disposed on first main surface 12a with an insulating layer 40 interposed therebetween.

Each outer electrode 22 includes an intermetallic compound as a main component. The intermetallic compound includes, for example, at least one high melting point metal selected from Cu and Ni and Sn defining and functioning as a low melting point metal. The intermetallic compound is particularly preferably an intermetallic compound generated by a reaction between Sn and a Cu—Ni alloy, for example. Such an intermetallic compound has the following advantages in the generation of the intermetallic compound: a reaction rate is fast, and a change in shape is small. It should be noted that the intermetallic compound may further include, for example, Ag as a high melting point metal.

Outer electrode 22 preferably includes, for example, a simple Sn metal in addition to the above-described intermetallic compound. The Sn metal of outer electrode 22 provides excellent solderability when mounting multilayer ceramic capacitor 10 on a mounting substrate or the like. In order to obtain outer electrode 22 including such a simple Sn metal, an excess of Sn may be included in a metal material to generate the intermetallic compound, for example. A portion of the excess of Sn is not provided for the generation of the intermetallic compound and remains in outer electrode 22 as the simple Sn metal.

Outer electrodes 22 can be formed by a screen printing method, a dispensing method, or a dipping method, for example.

It should be noted that a plating layer may be disposed on each of the surfaces at which first outer electrode 22a and second outer electrode 22b are exposed. The plating layer is disposed on the outermost layer of each of first outer electrode 22a and second outer electrode 22b.

Examples of the plating layer include, for example, at least one selected from Cu, Ni, Sn, Ag, Pd, an Ag—Pd alloy, Au, and the like.

The plating layer may include a plurality of layers. In this case, the plating layer preferably has a two-layer structure including a Ni plating layer and a Sn plating layer, for example. Since the Ni plating layer covers the surface of the underlying electrode layer, the underlying electrode layer can be prevented from being eroded by a solder when mounting multilayer electronic capacitor 10. The solder is used for mounting. Moreover, since the Sn plating layer is provided on the surface of the Ni plating layer, the wettability of the solder used for mounting is improved when mounting multilayer ceramic capacitor 10, with the result that multilayer electronic capacitor 10 can be easily and securely mounted.

The thickness of each plating layer is preferably more than or equal to about 2 μm and less than or equal to about 15 μm, for example.

In multilayer ceramic capacitor 10 defining and functioning as the multilayer ceramic electronic component according to the present preferred embodiment, insulating layer 40 is disposed on the surface of first main surface 12a of multilayer body 12. Insulating layer 40 is preferably disposed on the entirety or substantially the entirety of first main surface 12a.

First outer electrode 22a disposed on the first main surface 12a side is disposed on insulating layer 40. More specifically, an end edge portion 22a1 of first outer electrode 22a on the first main surface 12a side is disposed on insulating layer 40. Moreover, second outer electrode 22b disposed on the first main surface 12a side is disposed on insulating layer 40. More specifically, end edge portion 22b1 of second outer electrode 22b on the first main surface 12a side is disposed on insulating layer 40.

Insulating layer 40 may be made of a ceramic, for example. When insulating layer 40 is made of a ceramic, at least one selected from $Al_2O_3$, PZT, SiC, $SiO_2$, MgO, and the like, for example, is preferably used. When insulating layer 40 is made of a ceramic, mechanical strength of multilayer ceramic capacitor 10 against stress can be further improved. When insulating layer 40 is made of a ceramic, the grain size of the ceramic included in insulating layer 40 is preferably smaller than the grain size of the ceramic included in ceramic layer 14.

When insulating layer 40 is made of a resin, insulating layer 40 may preferably include, for example, one or more of an epoxy resin, a silicone resin, a fluorine resin, a phenol resin, a urea resin, a melamine resin, an unsaturated polyester resin, barium titanate, alumina, silica, yttria, and zirconia. In this case, a thermosetting epoxy resin, which uses the same metal oxide as that used as a solder resist for printed boards, a silicone resin, a fluorine-based resin, a phenol-based resin, a melamine resin, barium titanate, alumina, silica, or the like, for example, is suitably used.

It should be noted that a boundary line between multilayer body 12 and insulating layer 40 can be distinguished by using energy dispersive X-ray spectroscopy (EDX). When the component of ceramic layer 14 of multilayer body 12 is the same or substantially the same as the component of insulating layer 40, the boundary line between multilayer body 12 and insulating layer 40 can be distinguished by observation with a focused ion beam scanning electron microscope (FIB-SEM) or the like.

A filling factor of insulating layer 40 is calculated as follows. That is, a cross section of multilayer body 12 (hereinafter, referred to as "LT cross section") including length direction z and layering direction x at a central portion of multilayer ceramic capacitor 10 in width direction y is exposed and multilayer ceramic capacitor 10 is polished. Then, an amount of voids in the LT cross section is measured using a focused ion beam scanning electron microscope (FIB-SEM), thus determining the filling factor of insulating layer 40. More specifically, by performing image processing on an image in a predetermined field of view, void portions and the other portions are distinguished from one another to calculate a ratio of the regions other than the void portions with respect to the whole of the image in the field of view, thereby calculating the filling factor.

The thickness of insulating layer 40 is preferably less than or equal to about 5 μm, for example. When the thickness is less than or equal to about 5 μm, multilayer ceramic capacitor 10 can be stably mounted on a mounting substrate. The thickness of insulating layer 40 is measured as the thickness of insulating layer 40 at the central portion in the cross section of the central portion in width direction y.

In multilayer ceramic capacitor 10 shown in FIG. 1, insulating layer 40 is disposed on the surface of first main surface 12a of multilayer body 12. First outer electrode 22a disposed on the first main surface 12a side is disposed on insulating layer 40, and second outer electrode 22b disposed on the first main surface 12a side is disposed on insulating layer 40. Thus, end edge portions 22a1, 22b2 of outer electrodes 22 on the first main surface 12a side are disposed on insulating layer 40. End edge portions 22a1, 22b2 of outer electrodes 22 on the first main surface 12a side are portions at which stress is concentrated in multilayer ceramic capacitor 10 when multilayer ceramic capacitor 10 is mounted on a mounting substrate. Thus, mechanical strength against stress on multilayer ceramic capacitor 10 can be improved.

Moreover, in multilayer ceramic capacitor 10 shown in FIG. 1, insulating layer 40 is disposed on the surface of first main surface 12a of multilayer body 12, first outer electrode 22a is disposed on first main surface 12a with insulating layer 40 being interposed therebetween, and second outer electrode 22b is disposed on first main surface 12a with insulating layer 40 being interposed therebetween. Thus, when mounting multilayer ceramic capacitor 10 on the mounting substrate, first outer electrode 22a and second outer electrode 22b are brought into contact with solders disposed on upper surfaces of land electrodes disposed on the mounting substrate prior to insulating layer 40, such that multilayer ceramic capacitor 10 can be stably mounted on the mounting substrate. Thus, a problem, such as a tombstone phenomenon, for example, is able to be reduced or prevented.

Modification

Next, a multilayer ceramic capacitor will be described as an exemplary multilayer ceramic electronic component according to a modification of a preferred embodiment of the present invention. It should be noted that although a multilayer ceramic capacitor 10A will be described as an exemplary multilayer ceramic electronic component in the present preferred embodiment, the multilayer ceramic electronic component is not limited to the multilayer ceramic capacitor.

Multilayer ceramic capacitor 10A according to the modification has the same or substantially the same configuration as that of multilayer ceramic capacitor 10, except that each outer electrode 22 includes underlying electrode layer 24 and plating layer 26 disposed on the surface of underlying electrode layer 24. Therefore, the same or substantially the same portions as those of multilayer ceramic capacitor 10 are denoted by the same reference characters and will not be described.

Figure 5:
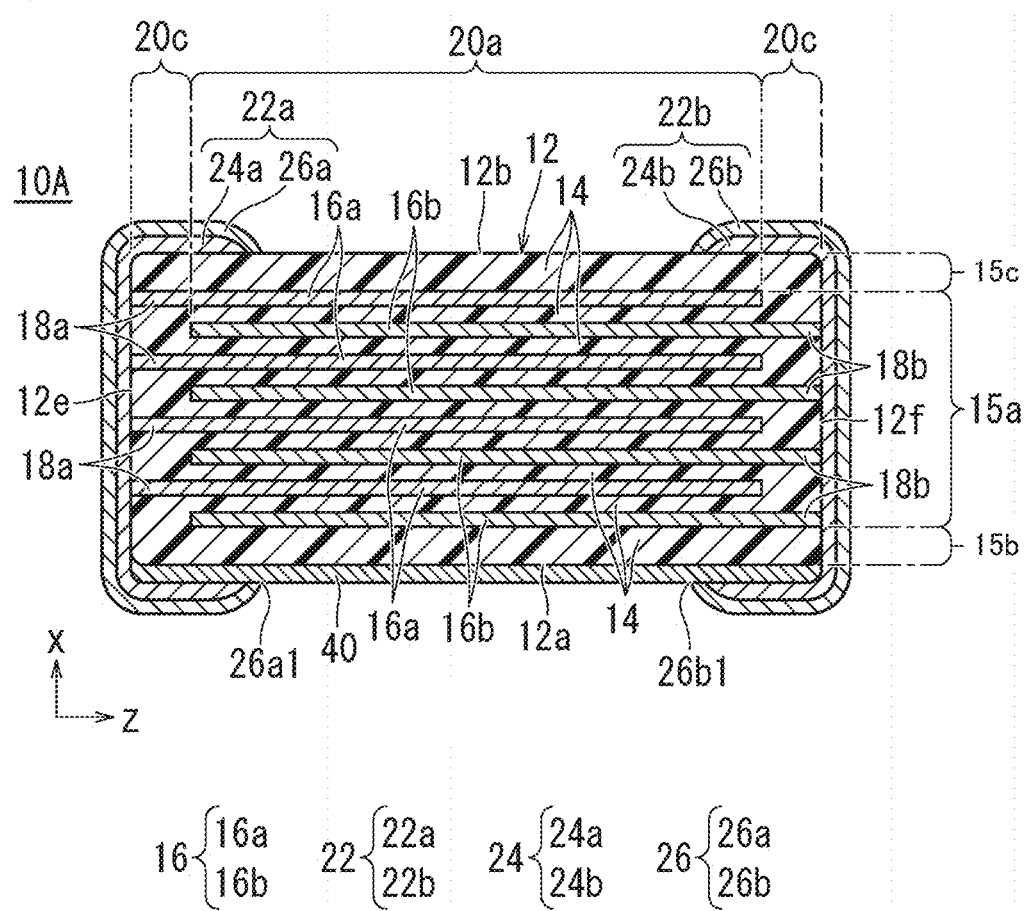
FIG. 5 is a cross sectional view corresponding to FIG. 3 and showing a multilayer ceramic capacitor as an exemplary multilayer ceramic electronic component according to a modification of a preferred embodiment of the present invention.

FIG. 5 is a cross sectional view corresponding to FIG. 3 and showing the multilayer ceramic capacitor as the exemplary multilayer ceramic electronic component according to the modification of the preferred embodiment of the present invention.

As shown in FIG. 5, each of first outer electrode 22a and second outer electrode 22b includes underlying electrode layer 24 and plating layer 26, which are provided in this order from the multilayer body 12 side.

Underlying electrode layers 24 include a first underlying electrode layer 24a and a second underlying electrode layer 24b.

First underlying electrode layer 24a is disposed on first end surface 12e of multilayer body 12 and extends from first end surface 12e so as to cover respective portions of first main surface 12a, second main surface 12b, first side surface 12c, and second side surface 12d. It should be noted that first underlying electrode layer 24a covers a portion of a surface of insulating layer 40 disposed on the first main surface 12a side.

Second underlying electrode layer 24b is disposed on second end surface 12f of multilayer body 12 and extends from second end surface 12f so as to cover respective portions of first main surface 12a, second main surface 12b, first side surface 12c, and second side surface 12d. It should be noted that second underlying electrode layer 24b covers a portion of a surface of insulating layer 40 disposed on the first main surface 12a side.

Each of underlying electrode layers 24 includes at least one selected from a baked layer, a resin layer, a thin film layer, and the like. The baked layer includes, for example, a glass component including Si, and Cu as a metal component. Examples of the metal component of the baked layer include at least one selected from Cu, Ni, Ag, Pd, a Ag—Pd alloy, Au, and the like. The baked layer is formed, for example, by applying a conductive paste including the glass component and the metal component onto multilayer body 12 and then baking it. The baked layer may be calcined together with inner electrode layers 16 or may be baked after calcining ceramic layers 14 and inner electrode layers 16. The baked layer may include a plurality of layers. The thickest portion of the baked layer preferably has a thickness of more than or equal to about 10 µm and less than or equal to about 150 µm, for example.

The resin layer may be provided on the baked layer, or may be provided directly on multilayer body 12 without providing the baked layer. Further, the resin layer may include a plurality of layers.

When the resin layer is provided on the baked layer, the resin layer may be a resin layer including conductive particles and a thermosetting resin, for example. The thickest portion of the resin layer preferably has a thickness of more than or equal to about 0.1 µm and less than or equal to about 50 µm, for example.

The thin film layer is formed by a thin film formation method such as a sputtering method or a vapor deposition method, for example. The thin film layer has a thickness of less than or equal to about 1 µm, for example, and includes metal particles deposited therein.

Plating layers 26 include a first plating layer 26a and a second plating layer 26b.

First plating layer 26a covers first underlying electrode layer 24a. Specifically, first plating layer 26a is preferably disposed on the surface of first underlying electrode layer 24a on first end surface 12e and preferably extends to the surface of first underlying electrode layer 24a on first main surface 12a, second main surface 12b, first side surface 12c, and second side surface 12d. It should be noted that first plating layer 26a covers a portion of a surface of insulating layer 40 disposed on the first main surface 12a side.

Second plating layer 26b covers second underlying electrode layer 24b. Specifically, second plating layer 26b is preferably disposed on the surface of second underlying electrode layer 24b on second end surface 12f and is preferably extends to the surface of second underlying electrode layer 24b on first main surface 12a, second main surface 12b, first side surface 12c, and second side surface 12d. It should be noted that second plating layer 26b covers a portion of a surface of insulating layer 40 disposed on the first main surface 12a side.

Examples of each plating layer include at least one selected from Cu, Ni, Sn, Ag, Pd, an Ag—Pd alloy, Au, and the like.

The plating layer may include a plurality of layers. In this case, the plating layer preferably has a two-layer structure including a Ni plating layer and a Sn plating layer, for example. Since the Ni plating layer covers the surface of the underlying electrode layer, the underlying electrode layer can be prevented from being eroded by a solder when mounting multilayer electronic capacitor 10. The solder is used for mounting. Moreover, since the Sn plating layer is provided on the surface of the Ni plating layer, the wettability of the solder used for mounting is improved when mounting multilayer ceramic capacitor 10, with the result that multilayer electronic capacitor 10 can be easily mounted.

It should be noted that when outer electrode 22 includes a plating layer, outer electrode 22 includes a plating layer provided directly on multilayer body 12 and connected directly to inner electrode layer 16. In this case, a catalyst may be provided on multilayer body 12 as a pretreatment. Moreover, the plating layer preferably includes a lower plating layer and an upper plating layer provided on the lower plating layer. Each of the lower plating layer and the upper plating layer preferably includes, for example, plating of one metal selected from a group consisting of Cu, Ni, Sn, Pb, Au, Ag, Pd, Bi, and Zn, or plating of an alloy including the metal. For example, when Ni is used as the inner electrode layer, Cu, which has excellent bondability with respect to Ni, is preferably used as the lower plating layer. Sn or Au, each of which has excellent solder wettability, is preferably used as the upper plating layer. As the lower plating layer, Ni having a solder barrier property is preferably used.

The upper plating layer may be provided as desired. Outer electrode 22 may be defined by the lower plating layer. The upper plating layer may be provided as an outermost layer of the plating layer. Another plating layer may be provided on the upper plating layer. The thickness of each one plating layer is preferably more than or equal to about 1 µm and less than or equal to about 10 µm, for example. The plating layer preferably includes no glass. A metal ratio of the plating layer per unit volume is preferably more than or equal to about 99 volume %, for example. Further, the plating layer is formed by, for example, grain growth along the thickness direction and has a pillar shape.

In multilayer ceramic capacitor 10 as the multilayer ceramic electronic component according to the present preferred embodiment, insulating layer 40 is disposed on the surface of first main surface 12a of multilayer body 12. Insulating layer 40 is preferably disposed on the entirety or substantially the entirety of first main surface 12a.

A portion of first plating layer 26a disposed on the first main surface 12a side is disposed on insulating layer 40. More specifically, an end edge portion 26a1 of first plating layer 26a on the first main surface 12a side is disposed on insulating layer 40. Moreover, a portion of second plating layer 26b disposed on the first main surface 12a side is disposed on insulating layer 40. More specifically, an end edge portion 26b1 of second plating layer 26b on the first main surface 12a side is disposed on insulating layer 40.

Multilayer ceramic capacitor 10A according to the modification of the present preferred embodiment shown in FIG. 5 provides the same or substantially the same advantageous effects as those of multilayer ceramic capacitor 10 according to the above-described preferred embodiment.

2. Method of Manufacturing Multilayer Ceramic Electronic Component

Next, the following describes an exemplary method of manufacturing the multilayer ceramic capacitor as the exemplary multilayer ceramic electronic component.

(1) First, dielectric sheets and a conductive paste for inner electrode are prepared. Each of the dielectric sheets and the conductive paste for inner electrode includes a binder and a solvent. For example, known organic binder and organic solvent may be used.

(2) Next, the conductive paste for inner electrode is printed on each of the dielectric sheets in a predetermined pattern by, for example, screen printing or gravure printing, thus forming an inner electrode pattern.

(3) Further, a predetermined number of dielectric sheets for outer layer on each of which no inner electrode pattern is formed are layered. Then, the dielectric sheets on which the inner electrodes are formed are sequentially layered thereon. Then, a predetermined number of dielectric sheets for outer layer are layered thereon. In this way, a multilayer sheet is produced.

(4) The obtained multilayer sheet is pressed in the layering direction by hydrostatic pressing or the like, for example. In this way, a multilayer block is produced.

(5) Next, the multilayer block is cut into a predetermined size, thus cutting out a multilayer chip. Corner portions and ridgeline portions of the multilayer chip may be rounded by barrel polishing or the like, for example.

(6) Further, the multilayer chip is calcined to produce multilayer body 12. The calcination temperature is preferably more than or equal to about 900° C. and less than or equal to about 1300° C., for example, although it depends on the materials of the dielectric and the inner electrodes.

(7) Next, an insulating layer providing step of providing insulating layer 40 on the first main surface of the multilayer body is performed.

When insulating layer 40 is made of a ceramic, insulating layer 40 is formed by, for example, an aerosol deposition method (AD method). Specifically, insulating layer 40 is formed in the following manner. A carrier gas and a raw material of the insulating film are mixed in an aerosol generator. The mixture is sent from the aerosol generator to a pipe as an aerosol, and is guided toward a nozzle provided at the tip thereof. The aerosol is thermally sprayed from the nozzle toward the first main surface side of the main body of the multilayer ceramic capacitor. As a result, fine particles of the raw material of insulating layer 40 hit against the first main surface side of the main body of the multilayer ceramic capacitor and are accordingly pulverized to form insulating layer 40. It should be noted that as the method of forming insulating layer 40, a thermal spraying method such as a cold spraying method, a CVD (chemical vapor deposition) method, or the like, for example, may be used instead of the AD method.

When the insulating layer is made of a resin, the insulating film can be formed by using a spraying apparatus, a dipping apparatus, or the like, for example. Alternatively, the insulating layer may be formed by pasting, or may be formed by the screen printing method, for example.

Then, insulating layer 40 is fixedly adhered to the multilayer ceramic capacitor by thermal curing or drying depending on physical properties of the insulating material.

(8) Then, outer electrodes 22 are formed on the both end surfaces of multilayer body 12.

First, a metal material paste for the material of outer electrodes 22 is prepared. The metal material paste includes at least one high melting point metal selected from, for example, Cu and Ni and Sn defining and functioning as a low melting point metal.

Then, a retaining plate is prepared to which the metal material paste is not joined under a reflow condition. Examples of the retaining plate include an alumina plate.

Then, the metal material paste is applied on the retaining substrate in a desired pattern by the screen printing, the dispensing method, or the like, for example, thus forming a thick film of the metal material paste.

Next, multilayer body 12 is placed on the retaining plate such that first end surface 12e faces the retaining plate. On this occasion, the position of first end surface 12e of multilayer body 12 and the position of the thick film of the metal material paste are aligned. The thick film of the metal material paste is adhered to multilayer body 12 so as to cover first end surface 12e of multilayer body 12. Similarly, the thick film of the metal material paste is adhered to multilayer body 12 so as to cover second end surface 12f of multilayer body 12.

Next, a reflow process is performed on multilayer body 12 having the thick films of the metal material paste adhered on the end surfaces. Accordingly, the intermetallic compound is generated by the metals in the metal material paste and the metal material paste is hardened to join outer electrodes 22 to multilayer body 12.

Further, as required, plating layers are formed on the surfaces of outer electrodes 22.

It should be noted that when each outer electrode 22 is includes underlying electrode layer 24 and plating layer 26, the conductive paste for outer electrode is applied to the both end surfaces of multilayer body 12 and is baked, thus forming the baked layers of the outer electrodes. The baking temperature is preferably more than or equal to about 700° C. and less than or equal to about 900° C., for example.

(10) Then, as required, plating layers are formed on the surfaces of the baked layers defining and functioning as underlying electrode layers 24.

The plating electrodes may be formed directly on the surfaces of the multilayer body without providing the baked layers. In this case, the following step (8) is performed instead of the foregoing step (8).

(8) Plating is performed on both the end surfaces of obtained multilayer body 12 to form underlying plating films on exposed portions of the inner electrodes. For the plating, for example, one of electrolytic plating or electroless plating may be used. However, the electroless plating requires a pretreatment with a catalyst or the like in order to improve a plating deposition rate, thus disadvantageously resulting in a complicated process. Therefore, normally, the electrolytic plating is preferably used. As the plating method, barrel plating, for example, is preferably used.

It should be noted that in the case of forming a surface conductor, a surface conductor pattern may be printed on the outermost ceramic green sheet in advance and may be calcined together with a ceramic body, or the surface conductor may be printed on a main surface of a calcined ceramic body and may be then baked.

(9) Further, as required, plating is formed on the surfaces of the baked layers of the conductive paste for outer electrode.

In this way, multilayer ceramic capacitor 10 is manufactured.

3. Multilayer Ceramic Electronic Component Mounted Structure

Figure 6:
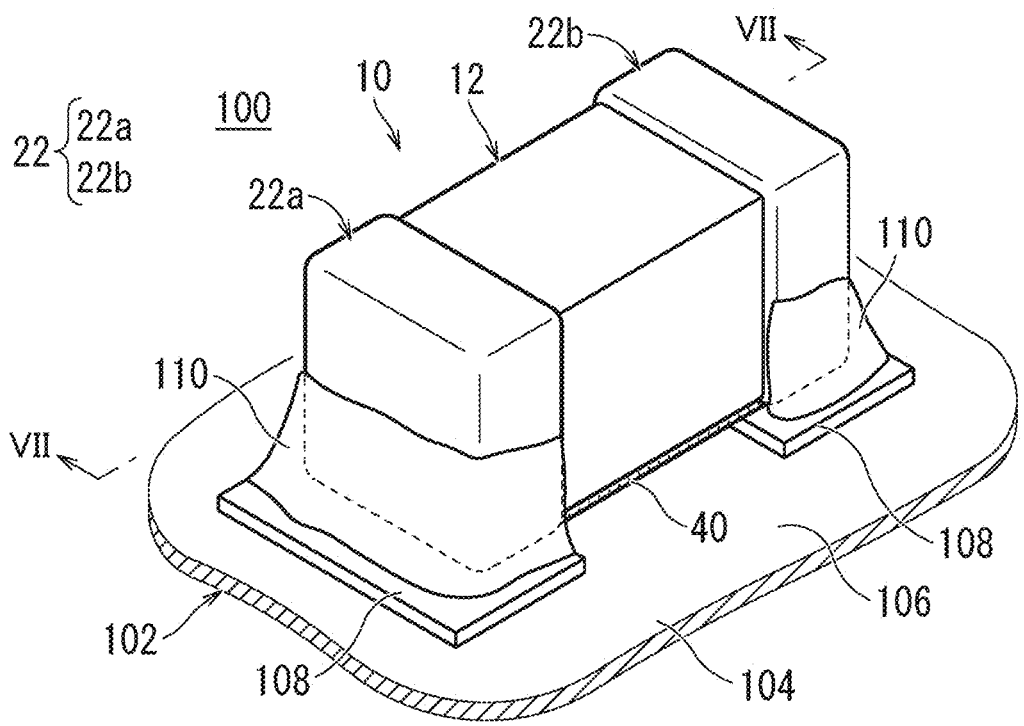
FIG. 6 is a perspective view showing a major portion of an exemplary multilayer ceramic capacitor mounted structure in which a multilayer ceramic capacitor as an exemplary multilayer ceramic electronic component according to a preferred embodiment of the present invention is mounted.
Figure 7:
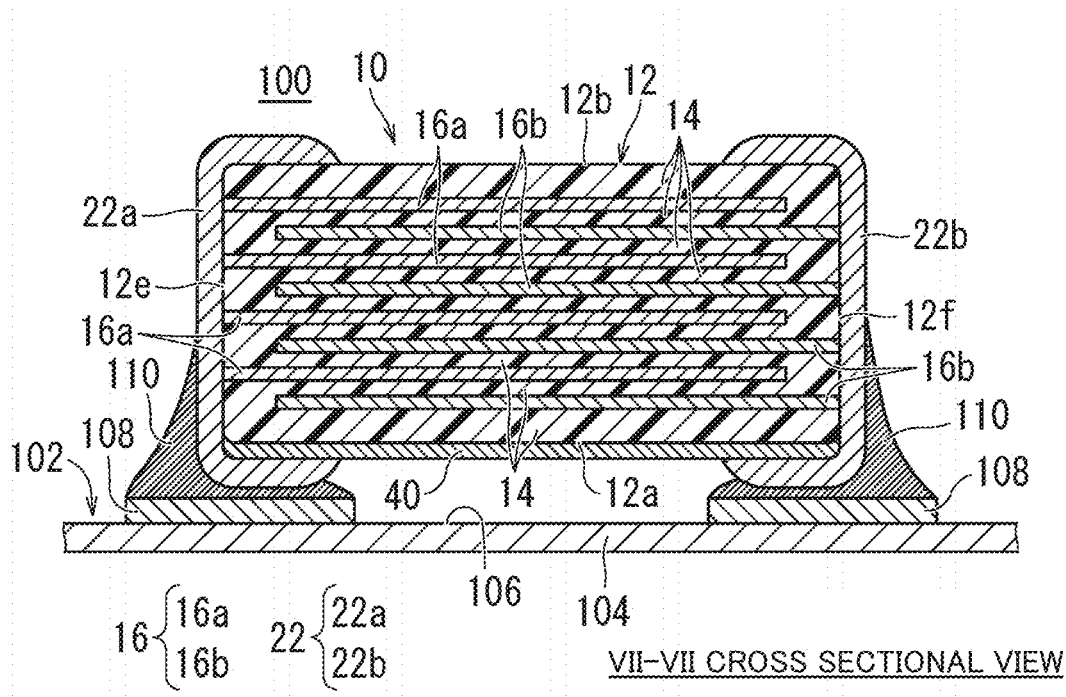
FIG. 7 is a cross sectional view taken along a line VII-VII and showing the multilayer ceramic capacitor mounted structure shown in FIG. 6.

Next, the following fully describes a multilayer ceramic capacitor mounted structure 100 in which the multilayer ceramic capacitor that is the above-described exemplary multilayer ceramic electronic component is mounted, particularly with reference to FIGS. 6 and 7, for example. FIG. 6 is a perspective view showing a major portion of an exemplary multilayer ceramic capacitor mounted structure in which the multilayer ceramic capacitor that is the exemplary multilayer ceramic electronic component according to the above-described preferred embodiment of the present invention is mounted. FIG. 7 is a cross sectional view taken along a line VII-VII and showing the multilayer ceramic capacitor mounted structure shown in FIG. 6.

Multilayer ceramic capacitor mounted structure 100 includes multilayer ceramic capacitor 10 and a mounting substrate 102 as shown in FIGS. 6 and 7, for example. Mounting substrate 102 includes a substrate main body 104. Substrate main body 104 is preferably made of, for example, a resin such as glass epoxy or a ceramic such as glass ceramic. Substrate main body 104 may include, for example, a plurality of layered insulator layers. A mounting surface 106 is provided on one main surface of substrate main body 104. Land electrodes 108 each having, for example, a rectangular or substantially rectangular shape when viewed in a plan view are disposed on mounting surface 106. Multilayer ceramic capacitor 10 is mounted thereon by fixedly connecting first outer electrode 22a and second outer electrode 22b of multilayer ceramic capacitor 10 to land electrodes 108 by solders 110, for example.

In multilayer ceramic capacitor mounted structure 100 shown in FIG. 6, insulating layer 40 is disposed on the surface of first main surface 12a of multilayer body 12. Thus, the end edge portions of outer electrodes 22 on the first main surface 12a side are disposed on insulating layer 40. The end edge portions of outer electrodes 22 on the first main surface 12a side are portions at which stress is concentrated in multilayer ceramic capacitor 10 when multilayer ceramic capacitor 10 is mounted on a mounting substrate. Thus, mechanical strength against stress on multilayer ceramic capacitor 10 after the mounting can be improved.

Moreover, in multilayer ceramic capacitor mounted structure 100 shown in FIG. 6, insulating layer 40 is disposed on the surface of first main surface 12a of multilayer body 12, first outer electrode 22a is disposed on first main surface 12a with insulating layer 40 being interposed therebetween, and second outer electrode 22b is disposed on first main surface 12a with insulating layer 40 being interposed therebetween. Thus, when mounting multilayer ceramic capacitor 10 on the mounting substrate, first outer electrode 22a and second outer electrode 22b are brought into contact with solders 110 disposed on upper surfaces of land electrodes 108 disposed on mounting substrate 102 prior to insulating layer 40, such that multilayer ceramic capacitor 10 can be stably mounted on mounting substrate 102. Thus, a problem such as a tombstone phenomenon, for example, can be reduced or prevented.

It should be noted that although the preferred embodiments of the present invention have been disclosed in the above description, the present invention is not limited thereto.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component comprising:
    a calcined multilayer body including a plurality of layered ceramic layers and a plurality of inner electrode layers layered on the ceramic layers, a first main surface and a second main surface facing each other in a layering direction, a first end surface and a second end surface facing each other in a length direction orthogonal or substantially orthogonal to the layering direction, and a first side surface and a second side surface facing each other in a width direction orthogonal or substantially orthogonal to the layering direction and the length direction;
    a first outer electrode covering the first end surface and extending from the first end surface so as to cover portions of the first main surface, the second main surface, the first side surface, and the second side surface; and
    a second outer electrode covering the second end surface and extending from the second end surface so as to cover portions of the first main surface, the second main surface, the first side surface, and the second side surface; wherein
    an insulating layer is provided only on a surface of the first main surface of the calcined multilayer body;
    a thickness of the insulating layer is less than or equal to about 5 μm;
    the first outer electrode and the second outer electrode disposed on the first main surface side are disposed on the insulating layer; and
    the insulating layer is made of a ceramic including a ceramic material as a main material.

2. The multilayer ceramic electronic component according to claim 1, wherein each of the first outer electrode and the second outer electrode includes an intermetallic compound as a main component, the intermetallic compound including at least one high melting point metal selected from Cu and Ni, and Sn as a low melting point metal.

3. The multilayer ceramic electronic component according to claim 2, wherein the intermetallic compound includes a material provided by a reaction between Sn and a Cu—Ni alloy.

4. The multilayer ceramic electronic component according to claim 1, wherein the ceramic includes $Al_2O_3$, PZT, SiC, $SiO_2$, or MgO.

5. The multilayer ceramic electronic component according to claim 1, wherein the calcined multilayer body includes rounded corners and rounded ridgeline portions.

6. The multilayer ceramic electronic component according to claim 1, wherein each of the plurality of ceramic layers includes at least one of $BaTiO_3$, $CaTiO_3$, $SrTiO_3$, Pb, Fe ferrite beads, or $CaZrO_3$ as a main component.

7. The multilayer ceramic electronic component according to claim 6, wherein each of the plurality of ceramic layers further includes at least one of a Mn compound, a Fe compound, a Cr compound, a Co compound or a Ni compound as a sub-component.

8. The multilayer ceramic electronic component according to claim 1, wherein each of the plurality of ceramic layers has a thickness that is more than or equal to about 0.3 μm and less than or equal to about 5.0 μm.

9. The multilayer ceramic electronic component according to claim 1, wherein a dimension of the calcined multilayer body in the layering direction is more than or equal to about 100 μm and less than or equal to about 4 mm, a dimension of the calcined multilayer body in the length direction is more than or equal to about 100 μm and less than or equal to about 3 mm, and a dimension of the calcined multilayer body in the width direction is more than or equal to about 100 μm and less than or equal to about 3 mm.

10. The multilayer ceramic electronic component according to claim 1, wherein each of the plurality of inner electrode layers has a thickness of more than or equal to about 0.1 μm and less than or equal to about 3.0 μm.

11. The multilayer ceramic electronic component according to claim 1, wherein each of the plurality of inner electrode layers includes at least one of Ni, Cu, or Ag.

12. The multilayer ceramic electronic component according to claim 1, wherein each of the first and second outer electrodes includes a plating layer as an outermost layer.

13. The multilayer ceramic electronic component according to claim 12, wherein the plating layer includes at least one of Cu, Ni, Sn, Ag, Pd, an Ag—Pd alloy, Au.

14. The multilayer ceramic electronic component according to claim 12, wherein the plating layer includes a plurality of layers.

15. The multilayer ceramic electronic component according to claim 12, wherein the plating layer includes a Ni plating layer and a Sn plating layer covering the Ni plating layer.

16. The multilayer ceramic electronic component according to claim 12, wherein the plating layer has a thickness of more than or equal to about 2 μm and less than or equal to about 15 μm.

* * * * *